Feb. 7, 1956 — E. B. KAHLA — 2,734,129
VEHICLE HEADLIGHT ATTACHMENT
Filed June 2, 1952
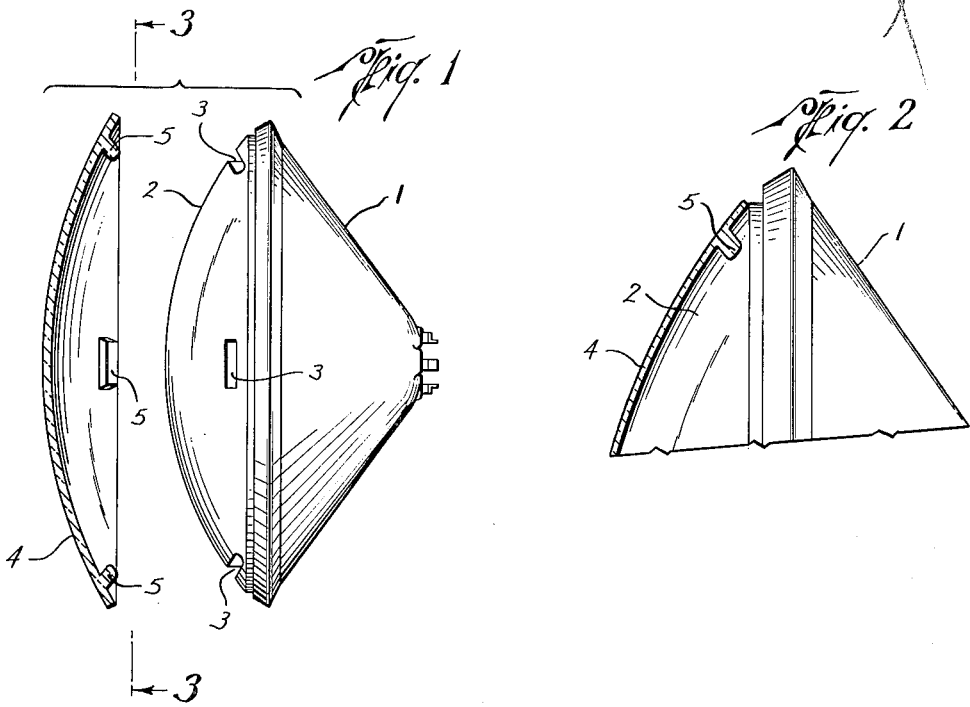
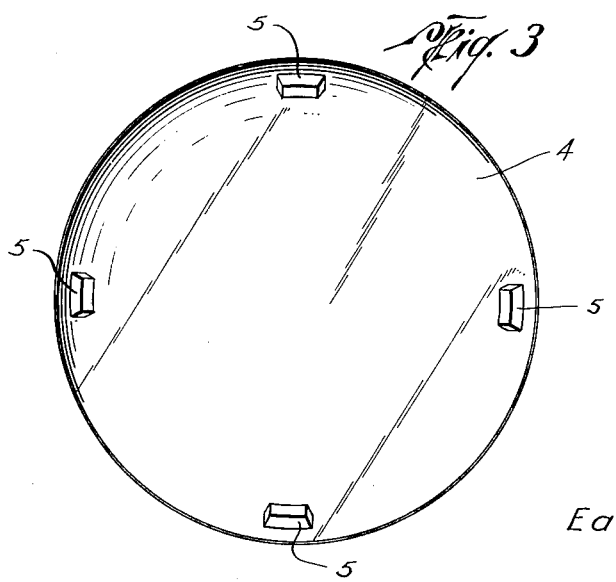
Earl B. Kahla
INVENTOR.
BY Ranseler O. Wyatt
ATTORNEY

United States Patent Office 2,734,129
Patented Feb. 7, 1956

2,734,129

VEHICLE HEADLIGHT ATTACHMENT

Earl B. Kahla, Huntsville, Tex.

Application June 2, 1952, Serial No. 291,107

3 Claims. (Cl. 240—46.59)

This invention relates to new and useful improvements in a headlight.

It is an object of this invention to provide a headlight that may be converted into a fog light.

It is another object of the invention to provide a headlight having a filter attachment for converting the light into a fog light that may be quickly and easily installed onto the headlight lens.

With the above and other objects in view, the invention has relation to certain novel features of construction, more particularly defined in the following specifications and illustrated in the accompanying drawings, wherein:

Figure 1 is a side elevational view of a headlight and of a filter to be mounted thereon shown in cross section.

Figure 2 is a side elevational view showing the filter mounted on the headlight, said view being fragmentary and partially in cross section.

Figure 3 is a rear elevational view of the filter shown in Figures 1 and 2.

Referring now more particularly to the drawings, the numeral 1 indicates a headlight such as a "sealed beam" headlight in which the lens 2 is moulded with suitable slots as 3, 3 formed therein. Concavo-convex filter 4, preferably formed of flexible plastic, and colored to filter the light rays of the headlight, as a clear yellow tint, is moulded to fit over the lens 2, the radius of the filter 4 being slightly greater than the radius of the lens 2. Projections 5, 5 are formed on the inside of the filter 4 adjacent the peripheral edge thereof, which said projections are directed inwardly and are positioned to be received by the slots 3, 3 in the headlight lens 2. The filter 4 being flexible, may be mounted on the lens 2 by yielding to bring the projections 5, 5 into alignment with the slots 3, 3 and will be maintained in position on the lens 2 by the yielding pressure toward resuming its moulded shape and by the engagement of the projections 5 in the slots 3. To remove the filter 4, of course, requires again bending the filter out of its moulded shape and thus drawing the projections 5 out of the slots 3.

As may be seen, the filters herein described may be easily stored in a minimum of space, such as in the glove compartment of an automobile, and may be quickly and easily applied to the lens of the headlight when fog or similar conditions wherein a filtered light is desirable is encountered.

While the above described invention refers to a "sealed beam" headlight as the preferred type of headlight, it is contemplated that any type of headlight having a headlight housing, and a source of light within said housing, may be designed to receive a moulded lens formed to receive the filter herein described.

While the foregoing is considered a preferred form of the invention, it is by way of illustration only, the broad principle of the invention being defined by the appended claims.

What I claim is:

1. In a headlight, a headlight casing, means for projecting rays of light mounted in said casing, a concavo-convex lens on said casing having a series of inwardly and concentrically directed slots moulded in the outer surface thereof, a filter of flexible material of concavo convex conformation and of slightly greater radius than the radius of the lens, and projections on the concave face of said filter adapted to be received by said slots.

2. In a headlight lens, a concavo convex transparent member, a plurality of inwardly directed depressions in said member adjacent the periphery of said member, a concavo convex elastic filter adapted to be stretched to conform to the shape of said member and having inwardly projecting studs to be mounted in said depressions.

3. In a headlight lens, a concavo convex transparent member, a plurality of inwardly directed depressions in said member adjacent the periphery of said member, a concavo convex filter adapted to be stretched to conform to the shape of said member being of a semielastic material and having projections on said filter adapted to be inserted into said depressions and to be maintained therein by the elasticity of said filter.

References Cited in the file of this patent

UNITED STATES PATENTS

| | | |
|---|---|---|
| 1,619,038 | Rice | Mar. 1, 1927 |
| 1,637,622 | Radford | Aug. 2, 1927 |
| 2,011,868 | Michel | Aug. 20, 1935 |
| 2,158,121 | Hirschberg | May 16, 1939 |
| 2,476,109 | Neitzel | July 12, 1949 |